Figure 1:
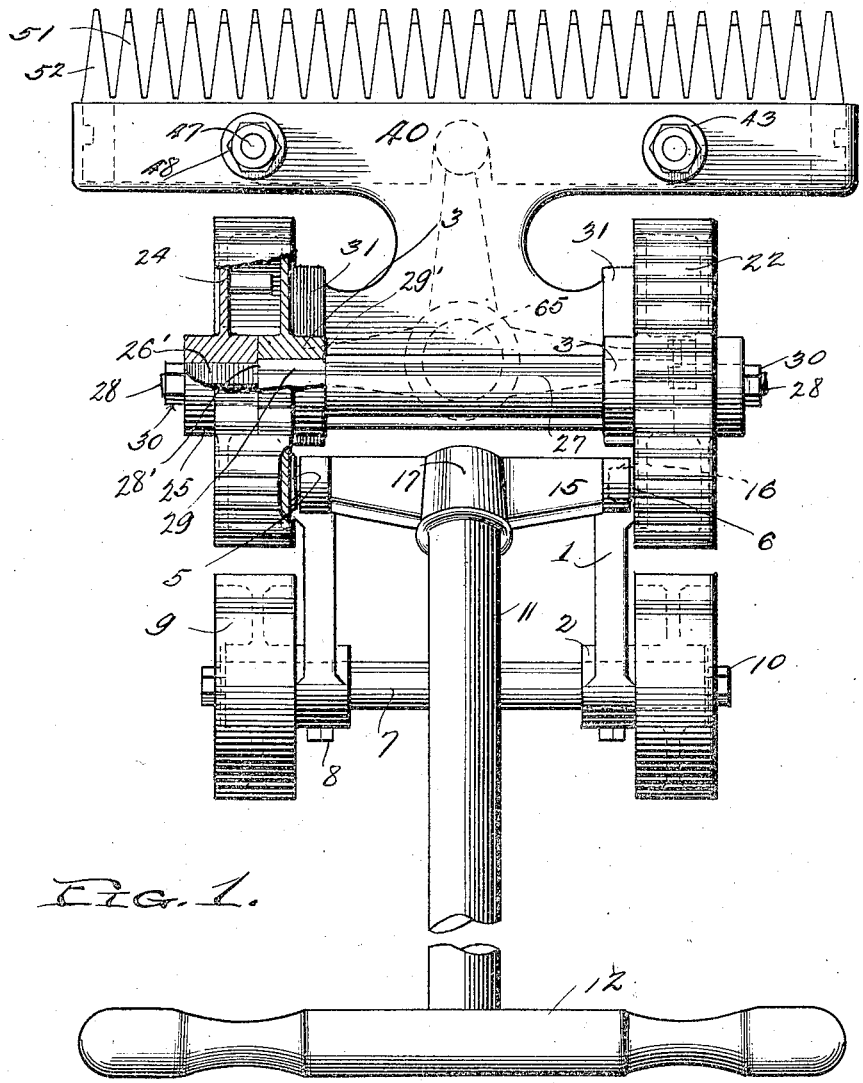

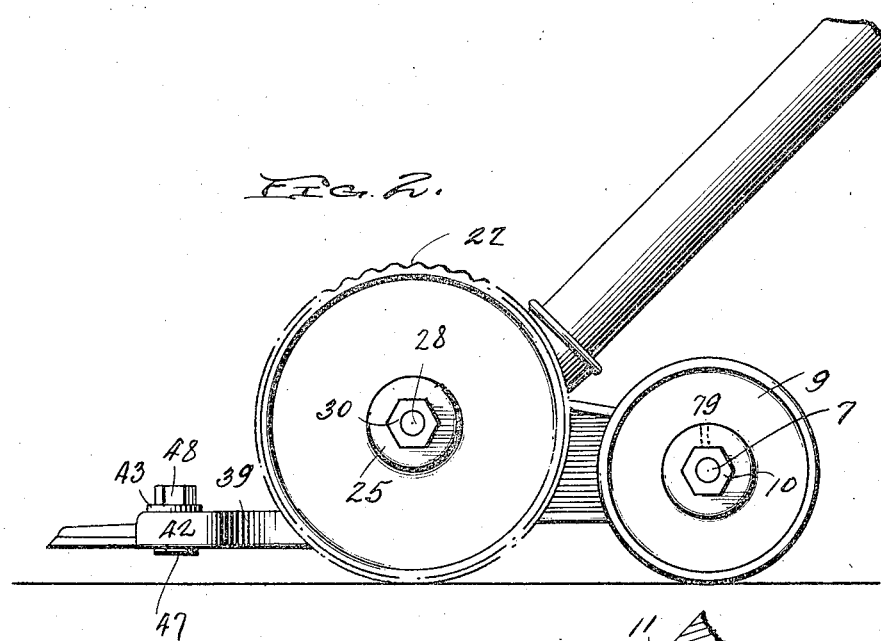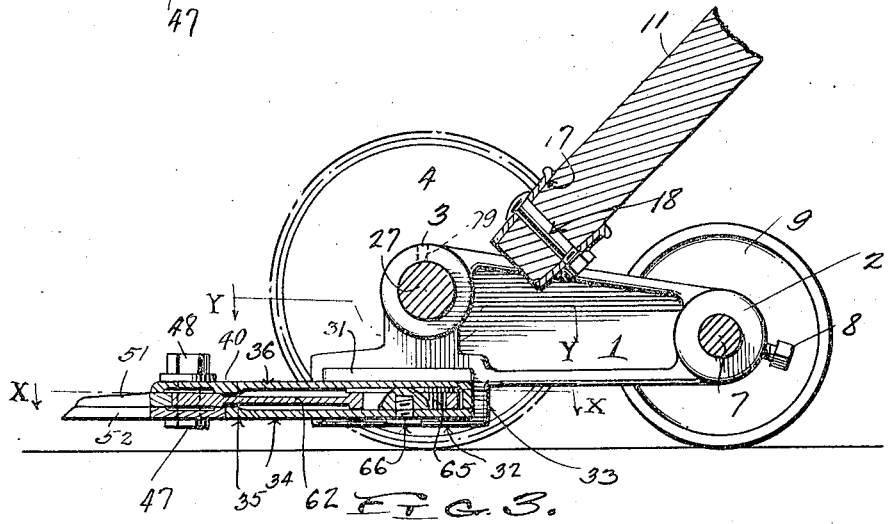

J. N. M. KEYZER.
LAWN MOWER.
APPLICATION FILED SEPT. 30, 1919.
1,351,520.
Patented Aug. 31, 1920.
3 SHEETS—SHEET 3.
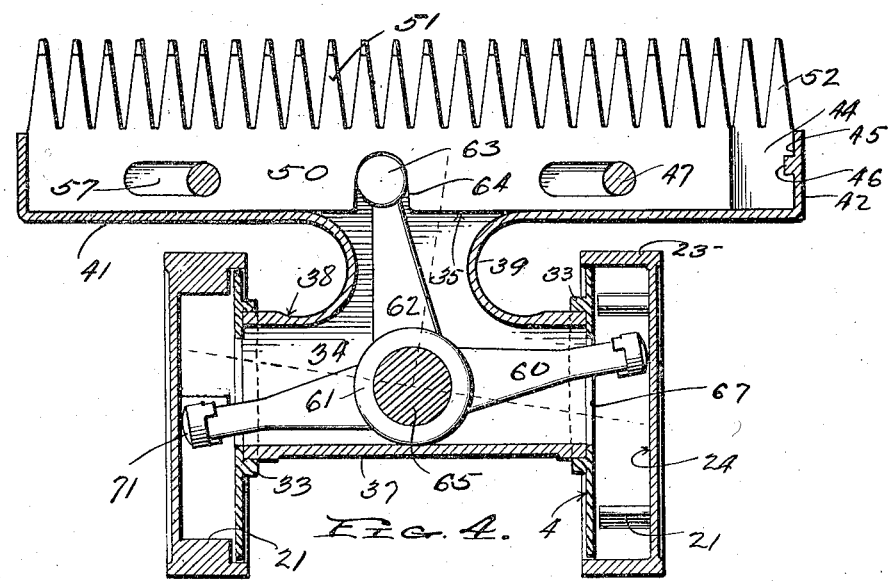
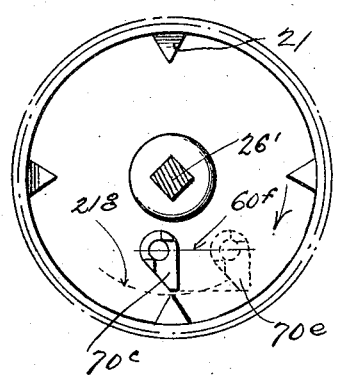
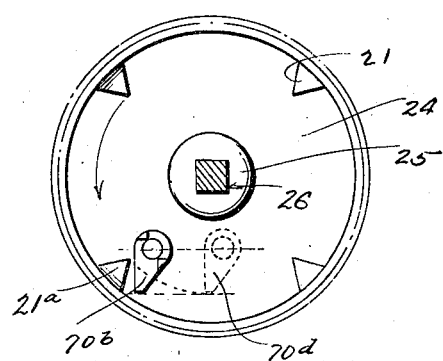
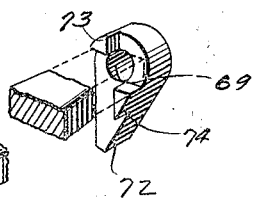
Inventor
J. N. M. Keyzer
Attorneys

UNITED STATES PATENT OFFICE.

JOSEPH N. M. KEYZER, OF LYNCHBURG, VIRGINIA, ASSIGNOR TO SOUTHERN ELECTRO STEEL COMPANY, INC., OF LYNCHBURG, VIRGINIA, A CORPORATION OF VIRGINIA.

LAWN-MOWER.

1,351,520.   Specification of Letters Patent.   Patented Aug. 31, 1920.

Application filed September 30, 1919. Serial No. 327,450.

*To all whom it may concern:*

Be it known that I, JOSEPH N. M. KEYZER, a citizen of the United States, residing at Lynchburg, in the county of Campbell, State of Virginia, have invented certain new and useful Improvements in Lawn-Mowers; and I do hereby declare the following to be a full, clear, and exact description of the invention, such as will enable others skilled in the art to which it appertains to make and use the same.

This invention relates to harvesters and more especially to hand machines intended for cutting lawn grass, the primary object of the invention being to simplify and cheapen such a machine while retaining essential features of those already on the market.

This object is attained by reducing the number of parts, by making them so far as possible, of cheap castings standardized so that they may be readily replaced, by utilizing certain of the parts for maintaining assembly and by omitting the usual gears and such other details as are mere requirements.

A further object of the invention is to provide a construction in which the cutting knives, as well as the mechanism that operates them from the ground wheels, are positioned close to the ground to permit an unobstructed passage for the grass from the cutters, across and from the rear of the machine to the ground, or to such receptacle as may be provided to receive it. Other objects of the invention include the provision of an improved mechanism comprising a reciprocatory cutter in which the movable cutter bar has an intermittent reciprocatory motion, whereby to permit of entrance of the standing grass well within the swath of the knives before operation of the latter in each direction.

One feature of the invention is the employment of a reciprocatory sickle bar whose knives move across guide fingers that may be sharpened to constitute cutters, and I find that the use of this type of cutting apparatus in place of the rotary cutter, both reduces the number of parts and size of the whole and permits the cutting apparatus to be housed to prevent clogging and rusting from damp grass.

While I do not wish to be limited to the precise construction and proportion of parts set forth herein and shown in the drawings, I will say that they disclose a form of the invention which I have found will operate successfully, and therefore are sufficient for the purposes of this specification.

Referring more particularly to the drawings,

Figure 1 is a plan view.
Fig. 2 is a left side elevation.
Fig. 3 is a vertical longitudinal section.
Fig. 4 is a compound horizontal section, being taken about on the line x—x of Fig. 3 through the cutting and driving apparatus and on the line y—y through the main wheels.
Fig. 5 is an inside elevation of the left main wheel and Fig. 6 of the right main wheel.
Fig. 7 is a perspective detail of the rocker partly broken away.

The frame of this machine is in two complementary members which are held spaced and parallel by the shafts or axles of the wheels. Describing the frame member 1 which is at the right in Fig. 1 and in elevation in Fig. 3, it has a perforated boss 2 at its rear end for the rear axle, a bearing 3 for the front axle, and a circular plate 4 fixedly surrounding this bearing and closing the open inner side of the rim wheel which constitutes the right main wheel. This plate carries a boss 5 and pin 6 constituting one bearing for the handle-yoke, and the plate beneath its bearing 3 is specially formed as hereinafter described so as to engage the ends of the housing or casing which contains the cutting apparatus. The roller shaft or rear axle 7 passes through the rear bosses 2 wherein it may be held by set screws 8, and its extremities are here shown as constituting bearings for rollers or wheels 9 held removably thereon by nuts 10. I prefer to mount these on the ends of the shaft as shown, although I do not wish to be limited in this particular. The handle 11 is a staff having a hand-piece 12 across its upper end; and a yoke 15 has sockets 16 at its extremities receiving the pins 6, the lower end of the handle being attached to the center of said yoke by any suitable means, as by being passed into a socket 17 where it may be held by a screw or bolt 18. Thus the machine may be propelled forward by pushing on the hand-piece, and because the yoke is pivoted in the frame, the hand-piece may be held higher or lower to accommodate the convenience of the operator.

Each main wheel is a drum, its outer side being a closed circular plate 24 and its periphery being a rim 23 of such size as to pass around the edge of the plate 4 as best seen in Fig. 4, and the outer face of the rim is roughened or corrugated as at 22 while the inner face of the rim carries four cams 21. The center of the plate 24 is cast with a boss 25 pierced with a squared opening 26 whose corners are opposite the cams as seen in Fig. 6, and through this opening passes the reduced and squared extremity 26' of the main shaft or front axle 27. Each end of this shaft has a shoulder 28' next inside the squared portion, next inside the shoulder it has a trunnion 29 journaled in the bearing 3 of one of the side members, and next inside the trunnion it has another shoulder 29' as best seen where the parts are broken away in Fig. 1; and therefore when the nut 30 on the reduced and threaded extension 28 is tightened up, the boss or hub 25 of the wheel is clamped against the shoulder 28', while leaving sufficient space between the inner end of this hub and the shoulder 29' to accommodate the length of the trunnion 29 and permit the same to rotate freely within the bearing 3. It follows that the setting up of the nut locks the wheel on the squared portion of the shaft and also holds the shaft against longitudinal movement through the bearing at each end and therefore holds the frame members 1 properly spaced. The fastening of the rear axle 7 in the bosses 2 assists in holding said members spaced and alined, and as long as they maintain this their normal position these members pivotally sustain the yoke 16 of the handle and also support the housing and the cutting apparatus and driving mechanism as will be described below.

In the lower portion of each plate 4, beneath and a little forward of the front axle 27, is formed an opening or slot perhaps best indicated at 67 in dotted lines in Fig. 9, the same being bounded by an upper flange 31, a lower flange 32, and end flanges 33, and these flanges inclose the rear lateral extremities of a housing or casing which contains the cutting apparatus and the driving means therefor. Said casing is made up of a lower plate 34 substantially T-shape in form, with the extremities of its head resting on the lower flanges 32 and its reduced shank projecting forward from the head to about the point 35, and an upper plate 36 whose rear end also is T-shaped to conform with the shape of the lower plate, the head having a depending flange 37 resting on the rear edge of the head of the lower plate as best seen in Fig. 3, while the extremities of this head pass into the openings in the circular plates 4 and underlie the upper flanges 31. The forward edges of the head of the T-shaped portion of this upper plate are also provided with flanges 38 as seen in Fig. 4, and these flanges are continued along the sides of its stem as at 39. But the stem of the upper plate is carried forward of the point 35 and then extended laterally beyond the main wheels to constitute a cover 40 for the cutting apparatus, this cover having a rear edge flange 41 and end flanges 42 cast integral therewith and depending therefrom, and the cover also being formed with perforated bosses 43 as seen in Figs. 1 and 2. The casing or housing is completed by a finger plate 44 shaped to fit within the flanges 41 and 42 and notched at its ends at 45 to engage upright ribs 46 within the end flanges as seen at the right of Fig. 4, and this finger plate is held in position by bolts 47 passing upward through it and through the bosses 43 and receiving nuts 48.

The cutting apparatus proper is composed of a sickle bar or plate 50 superimposed upon and shorter than the finger plate 44 and having slots 57 through which the bolts 47 pass loosely, and the sickle bar has forwardly projecting knives 51 which overlie and coact with the fingers 52 of the plate 44. By preference the knives are sharpened on their lower corners and the fingers are sharpened on their upper corners so that the latter become in effect fixed knives over which the other knives reciprocate in the operation of the machine. All knives of course project beyond the front edge of the housing or casing as best seen in Figs. 2 and 3, and the cutting apparatus by preference is considerably wider than the remainder of the machine so that it will cut a swath of grass extending well to either side of the wheels as will be clear.

The driving mechanism is mounted mainly within the rear or T-shaped portion of said housing as best seen in Figs. 3 and 4. It consists of a T-shaped rocker composed of side arms 60 cast integral with a ring 61 and a front arm 62 projecting forward from said ring and carrying a knob or crank 63 engaging a notch 64 in the rear edge of the sickle bar 50. The ring 61 is journaled on a stud 65 which is cast as an integral member of and depends from the rear portion of the upper plate 36, and the lower plate 32 of the housing is held against the lower end of this stud by a screw 66 passing upward thereinto as seen in Fig. 3. Each arm of the rocker projects laterally within the housing, through the slot 67 in one of the circular plates 4, and is provided at its extremity with a trunnion 68. The latter enters a socket 69 in the head of a hanging pawl 70, the head being rounded on its outer side as at 71 so that contact with the outer side plate 24 of the main wheel or drum will hold the pawl on the trunnion 68 and permit its nose 72 to hang within the drum as seen in Figs. 5 and 6. Each pawl on its inner side is also provided with a pair of lugs 73 and 74 which are so set around its socket as to coact with the rectangular outer end of the arm 60 and permit the pawl to swing in one direction on the trunnion but prevent it from swinging in the other direction. It will be observed that the cams 21 on each main wheel are opposite the angles of the squared portion 26 of the main shaft 27, but disposed in staggered relation to the cams on the other main wheel, there being four cams in each wheel or eight in both of them. Thus as the cam 21ª of Fig. 6 strikes the pawl 70ᵇ, the opposite pawl 70ᶜ of Fig. 5 is free from contact with any cam. As the pawl of Fig. 6 is forced to the position 70ᵈ, the opposite pawl 70ᶜ of Fig. 5 is forced to the position 70ᵉ because the rocker swings in a strictly horizontal plane indicated by the line 60ᶠ and the trunnions of the pawls always remain in this plane whereas the cams are traveling through the circle indicated at 21ᵍ. Hence the rocker arms would cause the pawls to move from their full lined positions to their dotted lined positions, and then back, and the rocker will be actuated eight times at each revolution of the main shaft and its drums. But should the machine be reversed so that the drums turn in the other direction, the cams will pass freely under the pawls because the latter can turn on the trunnions by reason of the position of the lugs 73 and 74. This action of the rocker is communicated through its front arm 62 to the sickle bar 50 which is reciprocated over the finger plate 44. While not wishing to be confined in this respect, I prefer to make the depth of the knives 51 and 52 such that, in the forward progress of the machine between strokes of the sickle bar produced by its driving mechanism, just that much grass will be admitted as can be successfully cut by the ensuing stroke; and if this rule is carefully followed by the builder of the machine, it will be obvious that, whether it is driven forward rapidly or slowly, the clogging of the cutting apparatus is obviated.

I have not amplified details, such as oil holes shown only at 79 in Fig. 2, washers under the nuts, and wear plates and bushings at appropriate points if thought desirable, but in so far as possible I have preferred to omit all details except those considered absolutely necessary to the production of a machine which will operate successfully and whose wear will be distributed to a considerable extent throughout its parts. From this it will be gathered that I contemplate the production of a machine whose parts are cheap but standardized and easily assembled, and I propose to exploit the sale of this machine with the understanding that the most inexperienced person can handle it and the user can readily secure and replace any worn part at little expense. With each machine will doubtless be delivered to the purchaser a pamphlet of instructions, containing a price list of parts, and each retailer should be equipped with the latter. The pamphlet should contain instructions for taking the machine to pieces and reassembling. This is obviously accomplished by removing the two set screws 8 and the six nuts 10, 30 and 48. The sides 1 of the main frame may then be separated, and immediately the housing with its contained cutting apparatus is free. When its upper and lower plates are separated from each other, the sickle bar and the finger plate are free and the rocker arm drops off the stud 65, its pawls 70 dropping off its trunnions. Also instantly all interior parts are thus exposed for cleaning and oiling, and wear can be detected. The pamphlet should contain instructions for replacing these several parts in their proper order in reassembling the machine. It is true that in turning corners one main wheel cannot move with respect to the other, but I do not consider this a sufficiently serious drawback in grass cutters to warrant the complication of mechanism which would render it possible. While I have shown the roller in the form of two rear wheels, it is clear that it might be in the form of a single longer wheel or roller mounted on the rear axle between the bosses 2, and in that case the axle 7 might simply extend into said bosses, rather than projecting therethrough and forming trunnions for the wheels. Obviously the size of the roller or wheels here employed will regulate the position of the cutting apparatus with respect to the surface over which the machine is operated, but I find that in very few if any instances the user ever desires to adjust the height of the cut above the ground and therefore I consider it hardly worth while to provide means for permitting him to do so.

What is claimed is:

1. A lawn mower comprising a frame composed of two complementary members having oppositely disposed bosses pierced with bearings, a main shaft reduced near each end to form a shoulder, continued beyond the shoulder in a trunnion mounted through one of said bearings, and reduced beyond the trunnion, a pair of main wheels each having a hub with a bore to fit on a reduced portion of the shaft against a boss on one of said members, means for fastening the hub on the shaft, a cutting apparatus, and a housing carrying said apparatus, its ends being held removably by said members while the latter are held in their normal positions by said shoulders and hubs.

2. A lawn mower comprising a frame composed of complementary side members pierced with opposite bearings and opposite slots near their forward ends, a roller carried by the rear end of the frame, a main shaft reduced at each end to form a shoulder and continued beyond the same in a trunnion mounted in one of said bearings, a main wheel on said shaft beyond its trunnion, means for removably fastening each wheel on the shaft, a housing removably held in the slots of said members while the latter retain their normal position, a cutting apparatus, and driving mechanism therefor mounted in said housing and extending through said slots to be actuated by said wheels.

3. In a lawn mower, the combination with a frame, drum wheels journaled thereon, and cams within their peripheries; of a housing carried by said frame, a cutting apparatus carried by the housing, a rocker pivoted in the housing and having arms projecting into said drum wheels, each arm having a trunnion at its extremity, a pendant pawl mounted on said trunnion and having a trunnion at its extremity, a pend- the outer side plate of the drum wheel, its body having a lug engaging the arm to limit its movement on said trunnion in one direction and its nose adapted to be struck by said cams, and means for driving the cutting apparatus by the oscillation of said rocker.

4. In a lawn mower, the combination with a pair of side members having opposite front and rear openings and opposite slots beneath the front openings and also having opposite pins between the front and rear openings, a roller axle mounted through the rear openings, means for holding it therein and spacing said members, and a main wheel shaft mounted through the front openings and also spacing said members, of a handle having a yoke with sockets pivotally engaged by said pins while the members are held spaced, a support held in said slots while the members retain such spaced position, and a cutting apparatus and driving mechanism carried by said support.

5. In a lawn mower, the combination with a pair of side members having opposite front and rear openings, a main axle extending through the front openings and shouldered to space said members, main wheels detachably mounted on said axle, a roller axle extending through the rear openings, set screws holding it removably therein and also spacing the members, and rollers removably mounted on this axle of a handle, a support, means for holding both between said members while the latter retain their normal positions, and a cutting apparatus and driving mechanism therefor carried by said support.

6. In a lawn mower, the combination with a frame, a main shaft therein, drum wheels on said shaft, and cams within their peripheries; of a housing carried by said frame, a cutting apparatus carried by the housing, a stud within said housing, a three-arm rocker having a ring mounted on said stud, its front arm connected with said apparatus and its lateral arms projecting into said drum wheels, and pawls mounted on the extremities of the lateral arms and alternately engaged by the cams in the wheels to rock the driving mechanism when the wheels rotate forwardly.

7. In a lawn mower, the combination with a frame, a main shaft therein, drum wheels on said shaft, and cams within their peripheries; of a housing carried by said frame, a cutting apparatus carried by the housing, a stud within said housing, a rocker having a ring mounted on said stud and arms projecting into said drum wheels, each arm having a reduced trunnion at its extremity, a pendant pawl having a socket mounted on said trunnion and a rounded outer face to contact with the outer side plate of the drum wheel, its body having lugs engaging the arm to limit its movement on said trunnion in one direction and its nose adapted to be struck by said cams, and connections between said ring and cutting apparatus for actuating the latter by the oscillation of said rocker.

8. In a law mower, the combination with a frame composed of side members having circular plates at their forward ends with bearings at the centers of the plates and slots beneath said bearings, a roller whose axle removably connects the rear ends of the members, a main shaft journaled in said bearings and spacing the front ends of said members, and drum wheels removably mounted on the ends of said shaft with their rims inclosing said plates and having internal cams disposed in staggered relation; of a hollow housing having a transverse rear portion whose ends are removably mounted in said slots and held therein while said members retain their normal positions, the housing having a hollow neck projecting from its rear portion forward and a hollow transverse front portion, a cutting apparatus within the latter, a three-arm rocker centrally pivoted within the said rear portion and having one arm extended through the neck and connected with said apparatus and lateral arms projecting through said slots into the drum wheels, and pawls on said arms engaged by the cams within the wheels.

9. In a lawn mower, the combination with a frame composed of side members having circular plates at their forward ends with bearings at the centers of the plates and slots beneath said bearings, a roller whose axle removably connects the rear ends of the members, a main shaft journaled in said bearings and spacing the front ends of said members, and drum wheels removably mounted on the ends of said shaft with their rims inclosing said plates and having internal cams disposed in staggered relation; of a hollow casing including a T-shaped lower plate having the extremities of its head mounted in said openings and its shank projecting forward, and a cover plate whose rear portion corresponds in contour with said bottom plate and has front and rear flanges resting thereon, its extremities also held in said openings while the side members retain their normal position, one plate having a stud projecting toward and contacting with the other, a screw through the latter into said stud, a cutting apparatus at the front ends of said plates, and a three-arm rocker having a ring mounted on said stud, its front arm engaging the sickle bar of said apparatus and its lateral arms projecting through said slots and alternately actuated by said cams.

10. In a lawn mower, the combination with a frame having opposite horizontal slots with flanges along their tops and bottoms and rear ends, means for holding said members normally spaced, main wheels journaled outside such members, and cams within their rims in staggered relation; of a hollow housing comprising upper and lower plates laterally extended at their rear portions and held by said flanges while the members retain their normal positions, a bar across the front edge of the lower plate and having forwardly projecting fingers, bolts passing upward through said bar and the forward portion of the upper plate, a sickle bar between said forward portion and finger bar and having slots receiving said bolts and a notch between them, and driving mechanism consisting of a three-arm rocker pivoted within the rear portion of the housing with its front engaging said notch and its lateral arms projecting through said slots and actuated alternately by said cams.

In testimony whereof, I affix my signature.

JOSEPH N. M. KEYZER.